United States Patent
Crabtree et al.

[15] 3,674,252
[45] July 4, 1972

[54] VEHICLE LIFTING DEVICE

[72] Inventors: Ronald Crabtree, 103 Brunswick House, Crosley Wood Road; Peter Horacek, 56 Brunswick House, Crosley Wood Road, both of Bingley, Yorkshire, England

[22] Filed: Aug. 21, 1970

[21] Appl. No.: 65,993

[30] Foreign Application Priority Data

Sept. 8, 1969 Great Britain ..................... 44,210/69

[52] U.S. Cl. ................................. 269/55, 214/1 A, 254/94
[51] Int. Cl. .......................................... B23g 3/18, B66f 7/22
[58] Field of Search ................................ 254/94; 269/55-59; 214/1 A

[56] References Cited

UNITED STATES PATENTS

| | | | |
|---|---|---|---|
| 1,478,256 | 12/1923 | Reid | 269/55 X |
| 1,334,336 | 3/1920 | Weimar | 269/58 |
| 1,399,641 | 12/1921 | Mize et al. | 269/55 |
| 2,627,109 | 2/1953 | Bock et al. | 269/59 X |

*Primary Examiner*—Othell M. Simpson
*Attorney*—Stevens, Davis, Miller & Mosher

[57] ABSTRACT

Vehicle lifting means comprising cradle means including a pair of single or double bearers curved for at least part of their length and furnished with means for attaching them to the same side of a vehicle, the arrangement being such that with the bearers in position the vehicle can be rolled over and supported on its side.

6 Claims, 10 Drawing Figures

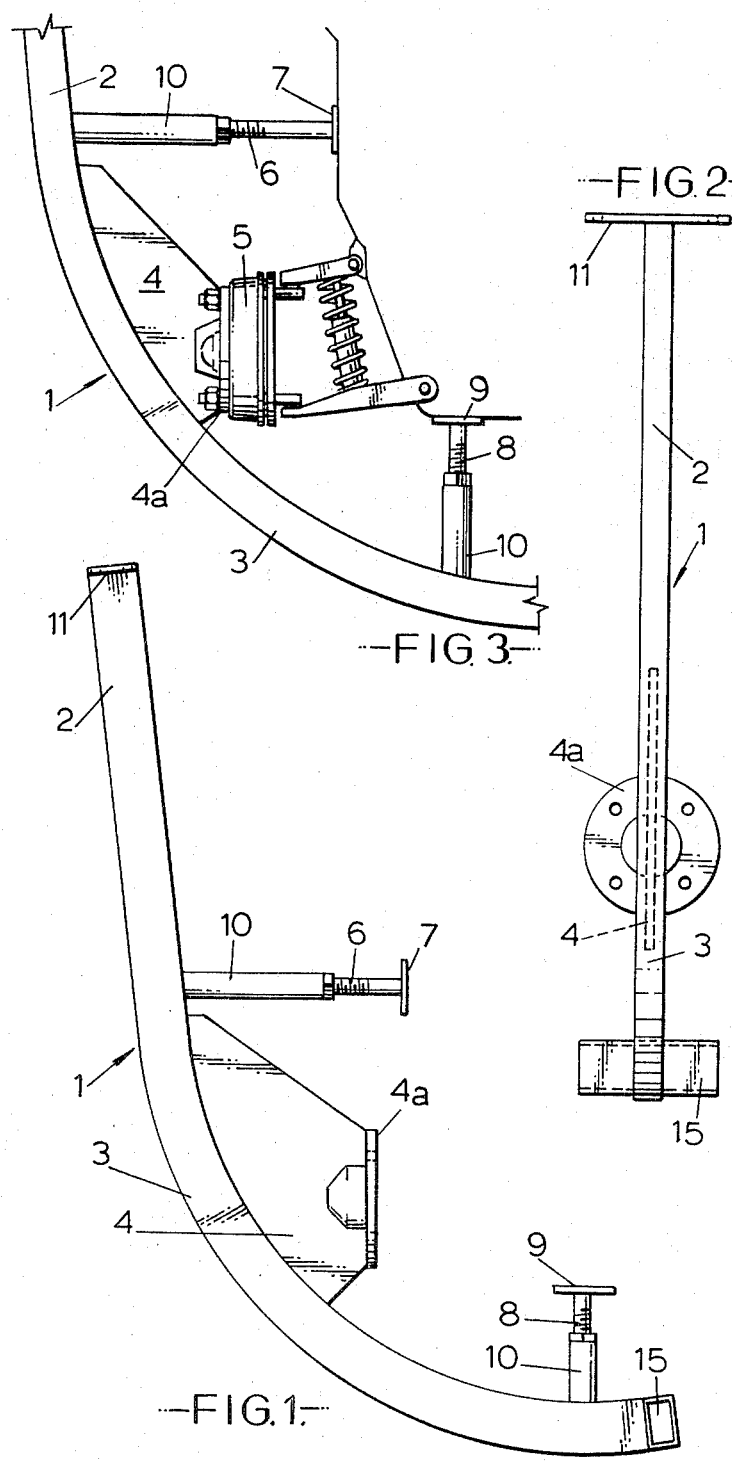

PATENTED JUL 4 1972 3,674,252

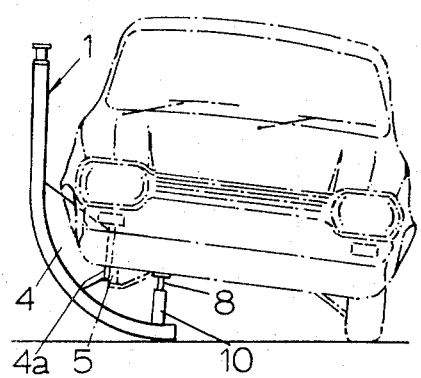
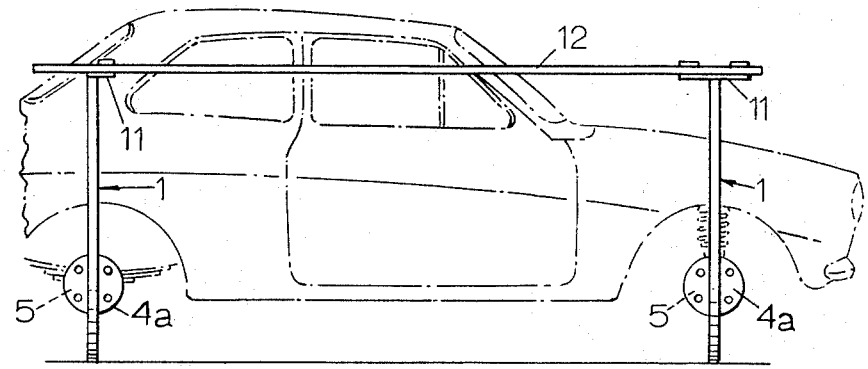
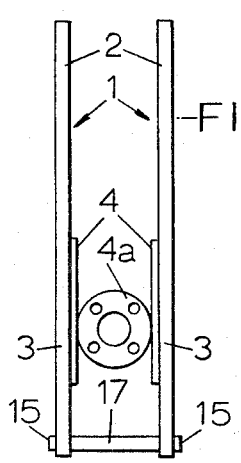
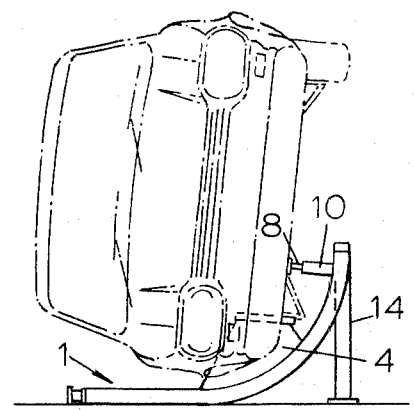

VEHICLE LIFTING DEVICE

This invention relates to lifting devices for vehicles.

The term "lifting" as used herein refers to the raising of a vehicle by a sideways tilting or rolling action.

According to the present invention there is provided a vehicle lifting device comprising cradle means including bearers curved for at least part of their length with means for attaching them to the same side of a vehicle, the arrangement being such that with the cradle means mounted on the vehicle the latter can be rolled over and supported on its side in a raised position.

The cradle means may include vehicle body, chassis, axle, subframe, suspension or other vehicle part supporting means or a combination thereof. The supporting means may be adjustable.

The bearers may comprise bars or tubes with means for joining the individual cradle means together.

The invention will be more particularly described with reference to the accompanying drawings in which embodiments of the invention are shown.

FIG. 1 shows one form of cradle with attachment and vehicle supporting means;

FIG. 2 shows a front elevation of the cradle means;

FIG. 3 shows a cradle applied to a vehicle body and chassis;

FIG. 7 is front view of a motor car with the cradle in position;

FIG. 8 is a side view of the motor car and cradle;

FIG. 9 is a front view of the motor car and cradle rolled over to expose the underside of the vehicle, and FIG. 10 shows a double cradle unit.

Figure 4:
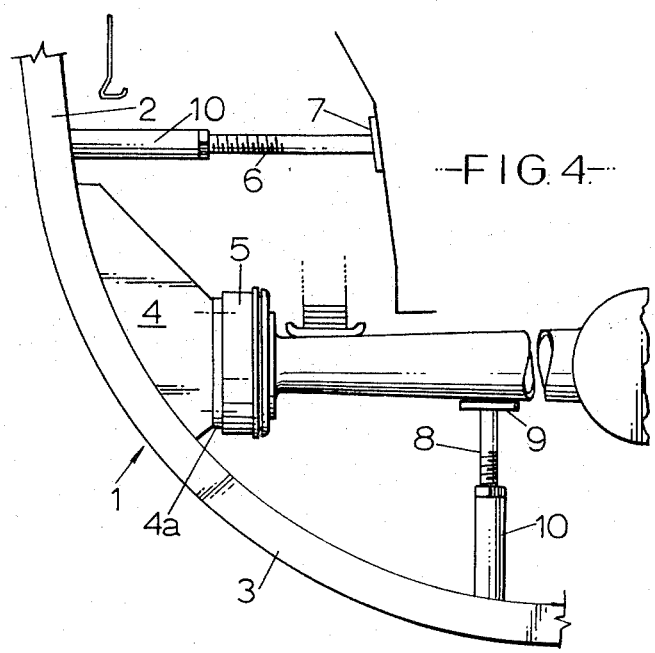
FIG. 4 shows a cradle applied to a vehicle body and axle.

The cradle means in FIGS. 1 and 2 comprises a tube (a rolled steel bar may be used) forming a bearer 1 which has a straight portion 2 extending from a curved part 3. On the latter there is provided an inwardly extending flanged bracket 4 which can be mounted on the usual wheel securing studs of the wheel mounting hub 5 after a wheel has been removed. The flange 4a may have holes or slots to receive the studs. The cradle means also includes an inwardly extending arm 6 terminating in a fixed (it may be pivotal) shoe 7 to bear against part of the car body or suspension and form a support therefore. A further arm 8 projects inwardly from the cradle part 3 and forms a support under the chassis, axle or suspension. This support is provided with a head flange 9 and either or both of the supports 6 or 8 may be made telescopic or be of some other construction to enable the supports to be adjustable in length to suit different vehicles. Conveniently each arm 6 and 8 is screw threaded and inserted into a tubular socket 10, secured to the bearer 1, through an adjusting nut. Moreover, there may be two or more sockets 10 in spaced relation to allow the arm 6 or 8 to be inserted into a selected socket to provide positional adjustment as well as length adjustment.

The end of the cradle part 2 is provided with a securing flange 11 to enable a cross tie member 12 (FIG. 8) to be attached to a pair of cradle means when mounted on the two hubs 5 of a vehicle to form a stay between a pair of cradle means for bracing purposes. The tie member 12 may be adjustable in length or adjustable in relation to the securing flange 11 to suit different distances between wheel hubs. The tie member may be attached to some other part of the cradle means or additional tie means provided. Also, with a vehicle rolled over on the cradle (FIG. 9) a supporting leg 14 can be attached to at least one of the bearers 1 as a safeguard or a prop applied to the vehicle. Conveniently the end of part 3 of each bearer is provided with a transverse socket 15 and the leg 14 has a spigot 16 to be pushed thereinto. Alternatively a "kick" leg may be pivotally attached to the end of each part 3 of the bearer 1 to hang pendantly and serve as a prop to prevent a vehicle rolling back. In many cases the loaded cradles will rest on the curved parts 3.

Figure 5:
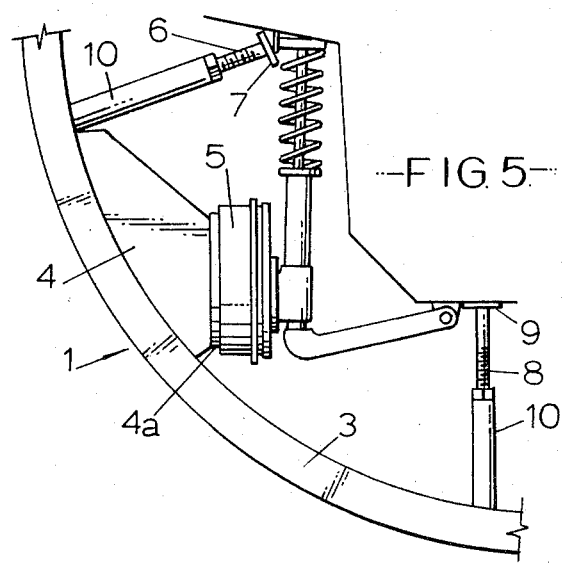
FIG. 5 shows a cradle applied to a vehicle chassis and suspension.
Figure 6:
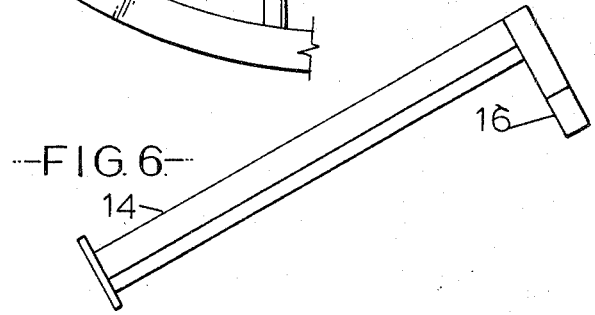
FIG. 6 shows a supporting leg for a cradle.

The cradle means can be applied in different ways to a vehicle or be modified to suit requirements and in FIG. 3 is shown secured to a hub 5 by a bracket 4 with a support 6 bearing against the vehicle body and the support 8 located under the chassis. In FIG. 4 the supports are applied to the body of a vehicle and under axle. The flange 9 instead of being flat may be V-shaped. In FIG. 5 the arms 6 and 8 bear against the vehicle suspension and under the chassis. In some cases the support 6 is disposed radially and in other cases at a required angle. As shown in FIG. 7 the support 6 may be dispensed with and this may apply to support 8.

A universal model could have detachable vehicle supports and/or hub mounting means 4 and a range of cradles provided to suit different types of vehicles.

Although normally each cradle means comprises a single bar or tube it may comprise a pair of bars or tubes to increase the bearing surfaces. FIG. 10 shows one form of double unit with side-by-side bearers 1 joined by a flange 4a. The parts 3 are shown joined by a cross member 17 which may provide a socket 15 on each side. The member may be dispensed with and this also applies to the tie bar 12.

With this device a road vehicle simply requires to be jacked up on one side, the wheels removed, a pair of cradle means secured to the wheel mounting hubs and tied together, or double units applied, whereupon the vehicle can be tilted or rolled over onto its side until supported on the straight parts 2 (or curved parts 3) of the cradle means.

The cradle means may be modified so that it can be attached to a vehicle on its wheels instead of removing the latter, or to the suspension, axle, body or other vehicle part with or without the wheels in position. Moreover, instead of providing a flange 11 some other form of connection may be used for the tie bar 12, e.g. the bar (it may be a tube) may have pendant spigots to enter sockets at the tops of the bearers 1.

Although the vehicle will normally be tilted or rolled over by manual effort alone, hydraulic, pneumatic or other power means may be used.

What we claim is:

1. A vehicle lifting device for rolling a vehicle partly over on its side and supporting a vehicle on its side in a raised position, comprising cradle means including longitudinal tie members and a pair of longitudinally spaced bearers joined by said tie members, each of said bearers curved for at least a part of its length, the convex surface of said curved part designed for rolling contact with a supporting surface, mounting means projecting inwardly from the concave side of said curved part of each bearer, including means for securing said mounting means to a vehicle wheel hub and a plurality of vehicle supporting means on each bearer, one of said supporting means extending from said bearer at a first side of said mounting means for engagement with a vehicle in a first position and another of said supporting means extending from said bearer at the second side of said mounting means for engagement with said vehicle at a second position, said first and second positions being located on opposite sides of the hub approximately in the plane of the respective bearer.

2. A vehicle lifting device according to claim 1, including a bracket projecting from each bearer with a flange for attachment to the wheel mounting hub of a vehicle by means of the wheel securing studs.

3. A vehicle lifting device according to claim 1, wherein the supporting means are adjustable.

4. A vehicle lifting device according to claim 3, wherein the supporting means comprise a member to engage part of a vehicle and said member is adjustably mounted in a socket projecting from the bearer.

5. A vehicle lifting device according to claim 1, wherein at least one bearer includes supporting means for preventing the vehicle from rolling back inadvertently.

6. A vehicle lifting device according to claim 1, wherein each bearer comprises a pair of bearing members having formation that are straight at one end and curved at the other end, and a mounting flange between the bearing members of each pair.

* * * * *